(12) United States Patent
Toikkanen et al.

(10) Patent No.: US 9,086,134 B2
(45) Date of Patent: Jul. 21, 2015

(54) PLANET WHEEL CARRIER FOR A PLANETARY GEAR

(71) Applicant: Moventas Gears Oy, Jyväskylä (FI)

(72) Inventors: Jari Toikkanen, Muurame (FI); Jorma Tirkkonen, Jyväskylä (FI)

(73) Assignee: MOVENTAS GEARS OY, Jyväskylä (FI)

( * ) Notice: Subject to any disclaimer, the term of this patent is extended or adjusted under 35 U.S.C. 154(b) by 0 days.

(21) Appl. No.: 14/186,709

(22) Filed: Feb. 21, 2014

(65) Prior Publication Data
US 2014/0243143 A1  Aug. 28, 2014

(30) Foreign Application Priority Data
Feb. 22, 2013  (EP) ...................................... 13156305

(51) Int. Cl.
*F16H 57/08*  (2006.01)
(52) U.S. Cl.
CPC ..................................... *F16H 57/082* (2013.01)
(58) Field of Classification Search
None
See application file for complete search history.

(56) References Cited

U.S. PATENT DOCUMENTS

| 5,470,286 | A | 11/1995 | Fan | |
|---|---|---|---|---|
| 2003/0232694 | A1 | 12/2003 | Buhrke | |
| 2012/0220419 | A1* | 8/2012 | Cho | 475/331 |
| 2013/0178326 | A1* | 7/2013 | Franke et al. | 475/331 |

FOREIGN PATENT DOCUMENTS

| DE | 10 2009 002 920 A1 | | 11/2010 |
|---|---|---|---|
| EP | 1 371 879 A2 | | 12/2003 |
| JP | 2005337400 A | * | 12/2005 |
| JP | 2007-71273 A | | 3/2007 |
| WO | WO 2011157842 A1 | * | 12/2011 |

* cited by examiner

*Primary Examiner* — Justin Holmes
*Assistant Examiner* — Timothy Hannon
(74) *Attorney, Agent, or Firm* — Birch, Stewart, Kolasch & Birch, LLP

(57) ABSTRACT

A planet wheel carrier which includes first and second end-sections for supporting shafts of planet wheels of a planetary gear, the planet wheel carrier containing a support structure connected to the first and second end-sections and located between the first and second end-sections in the axial direction of the planet wheels and between the planet wheels in the circumferential direction of the planet wheel carrier. The first end-section is attached to the support structure so that at least part of the first end-section is non-destructively detachable from the support structure. This feature facilitates the maintenance of the planetary gear because, after removing the first end-section or its detachable part, the planet wheels can be removed and installed substantially easier than in cases where there is a traditional one-piece planet wheel carrier.

12 Claims, 3 Drawing Sheets

US 9,086,134 B2

PLANET WHEEL CARRIER FOR A PLANETARY GEAR

FIELD OF THE INVENTION

The invention relates to a planet wheel carrier for a planetary gear. Furthermore, the invention relates to a planetary gear.

BACKGROUND

A planetary gear comprises a planet wheel carrier, a sun shaft, a gear ring, and planet wheels supported by the planet wheel carrier so that the planet wheels are meshing with the sun shaft and with the gear ring. The planet wheel carrier in its simple form comprises a first end-section for supporting first ends of the shafts of the planet wheels and a second end-section for supporting the second ends of the shafts of the planet wheels. In many cases, however, a planet wheel carrier of the kind described above can be mechanically too elastic, i.e. not sufficiently stiff, and thus the positions of the planet wheels with respect to the sun shaft and to the gear ring are not necessarily as desired especially during high load conditions. This may cause excessive wear of the teeth of the planet wheels, the teeth of the sun shaft, and the teeth of the gear ring.

In order to increase the mechanical stiffness, many planet wheel carriers comprise a support structure that is between the first and second end-sections in the axial direction of the planet wheels. An inconvenience related to the support structure is that it complicates the assembly and disassembly of the planet wheels of the planetary gear. Therefore, the support structure may complicate the maintenance of the planetary gear. Hence, there is often a trade-off between the mechanical stiffness of the planet wheel carrier and the complexity of the maintenance of the planetary gear.

Publication JP2007071273 discloses a planet wheel carrier comprising an end-plate that is non-destructively detachable from the support structure so as to facilitate the maintenance of the planetary gear.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the present invention, there is provided a new planet wheel carrier for a planetary gear. A planet wheel carrier according to the invention comprises:
- a first end-section for supporting first ends of the shafts of the planet wheels of the planetary gear,
- a second end-section for supporting the second ends of the shafts of the planet wheels, and
- a support structure connected to the first and second end-sections and located between the first and second end-sections in the axial direction of the planet wheels and between the planet wheels in the circumferential direction of the planet wheel carrier.

The above-mentioned first end-section is attached to the support structure so that at least a part of the first end-section is non-destructively detachable from the support structure, and there are mutually matching indentations in the support structure and in the first end-section so as to transfer torque between the support structure and the first end-section. The first end-section can be, for example but not necessarily, attached to the support structure with bolts.

The fact that at least a part of the first end-section can be detached from the support structure facilitates the maintenance of the planetary gear because, after removing the first end-section or its detachable part, the planet wheels can be removed and installed substantially easier than in cases where there is a traditional one-piece planet wheel carrier.

In accordance with the present invention, there is provided also a new planetary gear that comprises:
- a sun shaft,
- a gear ring,
- planet wheels, and
- a planet wheel carrier according to the invention for supporting the planet wheels so that the planet wheels are meshing with the sun shaft and with the gear ring.

A number of non-limiting and exemplifying embodiments of the invention are described in accompanied dependent claims.

Various non-limiting and exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an" throughout this document does not exclude a plurality.

BRIEF DESCRIPTION OF THE FIGURES

Exemplifying embodiments of the invention and their advantages are explained in greater detail below in the sense of examples and with reference to the accompanying drawings, in which.

DESCRIPTION OF THE EMBODIMENTS

Figure 1A:
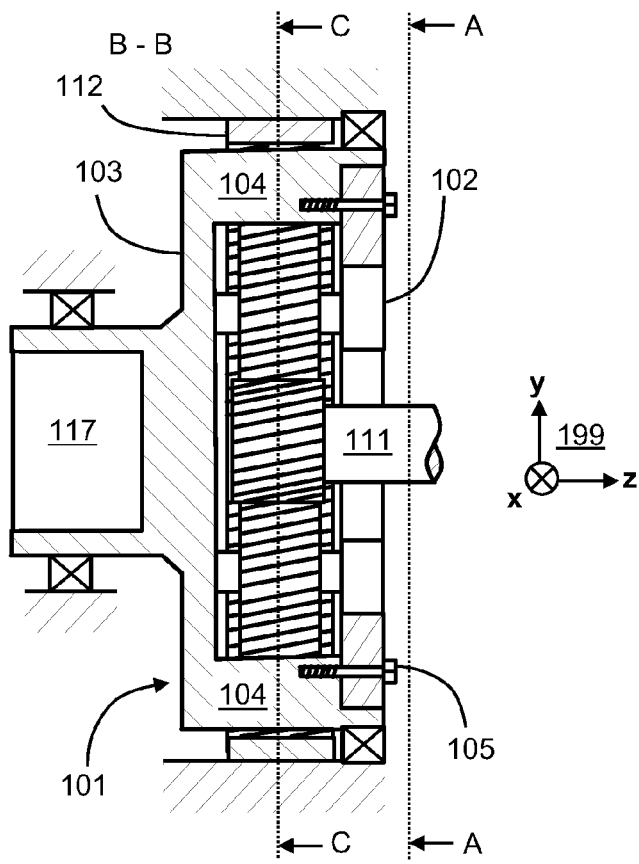
FIGS. 1a, 1b and 1c illustrate a planetary gear according to an exemplifying embodiment of the invention.
Figure 1B:
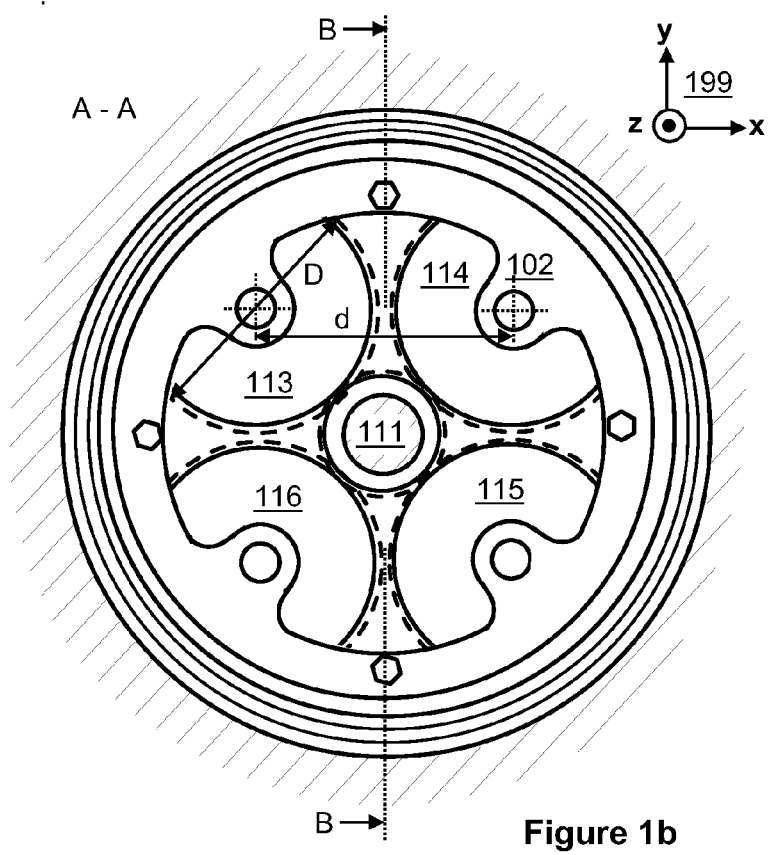
Figure 1C:
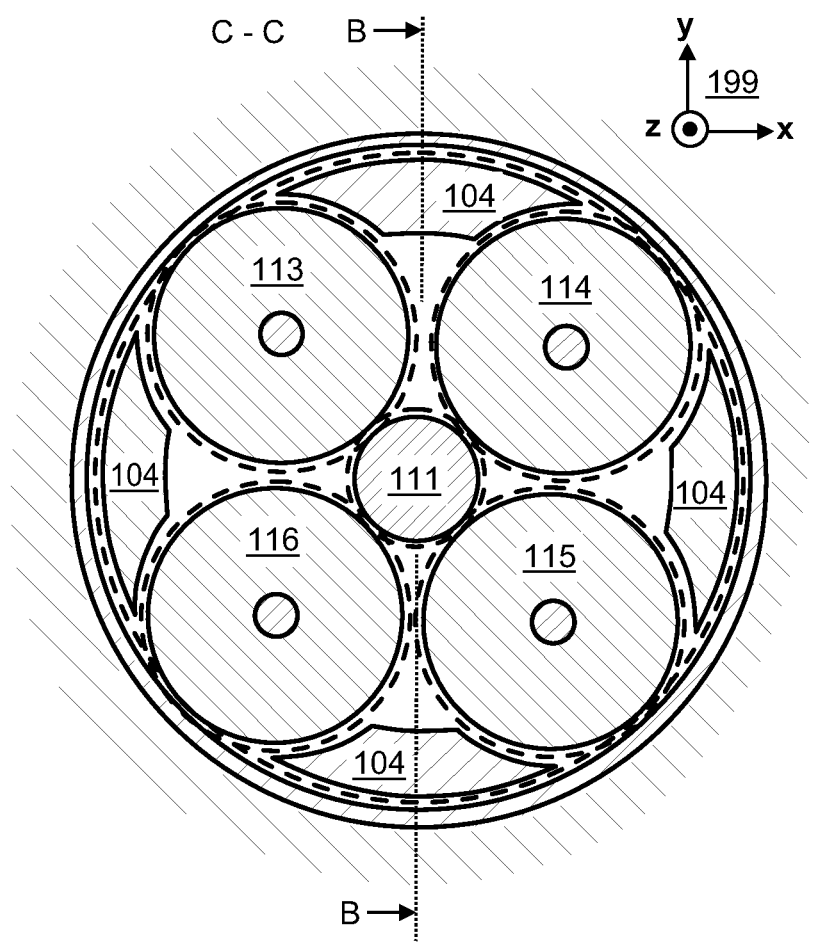

FIGS. 1a, 1b and 1c illustrate a planetary gear according to an exemplifying embodiment of the invention. FIG. 1a shows a view of a section taken along the line B-B shown in FIGS. 1b and 1c, FIG. 1b shows a view of a section taken along the line A-A shown in FIG. 1a, and FIG. 1c shows a view of a section taken along the line C-C shown in FIG. 1a. The planetary gear comprises a sun shaft 111, a gear ring 112, planet wheels 113, 114, 115 and 116, and a planet wheel carrier 101 according to an exemplifying embodiment of the invention for supporting the planet wheels so that the planet wheels are meshing with the sun shaft and with the gear ring as illustrated in FIGS. 1a and 1c. The planet wheel carrier 101 comprises a connection section 117 that can be connected to an external mechanical system, for example but not necessarily, a rotor of a wind turbine. The planet wheel carrier 101 comprises a first end-section 102 for supporting first ends of the shafts of the planet wheels 113-116. The planet wheel carrier 101 comprises a second end-section 103 for supporting the second ends of the shafts of the planet wheels. The planet wheel carrier 101 further comprises a support structure 104 connected to the first and second end-sections 102 and 103. The support structure is located between the first and second end-sections in the axial direction of the planet wheels and between the planet wheels in the circumferential direction of the planet wheel carrier. The axial direction is the direction of the z-axis of a coordinate system 199 shown in FIGS. 1a, 1b and 1c. The circumferential direction is the direction along the circumference of the gear ring 112.

The first end-section 102 of the planet wheel carrier 101 is attached to the support structure 104 so that the first end-section 102 is non-destructively detachable from the support structure 104. In the exemplifying case illustrated in FIGS. 1a, 1b and 1c, the first end-section 102 is attached to the support structure 104 with the aid of bolts. One of the bolts is denoted with a reference number 105 in FIG. 1a. There can be, for example but not necessarily, mutually matching indentations in the support structure 104 and in the first end-section 102 so as to transfer torque between the support structure 104 and the first end-section 102. The fact that the first end-section 102 can be detached from the support structure 104 facilitates the maintenance of the planetary gear because, after removing the end-section 102, the planet wheels can be removed and installed substantially in the axial direction of the planet wheels, i.e. the planet wheels can be removed substantially in the positive z-direction of a coordinate system 199 and installed substantially in the negative z-direction of the coordinate system 199.

In the exemplifying case illustrated in FIGS. 1a, 1b, and 1c, the support structure 104 is connected to outer rims of the first and second end-sections 102 and 103. As illustrated in FIG. 1c, the support structure 104 is configured to be so far from the geometrical rotation axis of the sun shaft 111 and the geometrical rotation axes of the planet wheels 113-116 are configured to be so near to the geometrical rotation axis of the sun shaft that the maximum diameter D of the planet wheels is capable of being at least 90%, or more advantageously at least 95%, of the distance d between the geometrical rotation axes of adjacent ones of the planet wheels. The maximum diameter D and the distance d are illustrated in FIG. 1b. The maximum diameter D is the diameter of the smallest circle that is capable of enveloping each of the planet wheels 113-116. Thus, the teeth of the planets wheels are included in the maximum diameter D. The gear ratio between the sun shaft 111 and the planet wheel 101 carrier is $D_R/D_S+1$, where $D_R$ is the diameter of the gear ring and $D_S$ is the diameter of the sun shaft. The diameter $D_S$ of the sun shaft cannot be smaller than:

$$D_R - 2 \times D_{max},$$

where $D_{max}$ is the greatest possible D, i.e. the greatest possible maximum diameter of the planet wheels. As the support structure 104 is designed so that it allows the maximum diameter D of the planet wheels to be at least 90% of the distance d between the geometrical rotation axes of adjacent ones of the planet wheels, it is possible to achieve a relatively high gear ratio. In the planet wheel carrier 101, the fact that the radially outermost parts of the support structure 104 give most of the contribution to the mechanical stiffness is utilized. Therefore, the gear ratio can be increased without substantially sacrificing the mechanical stiffness.

Figure 2:
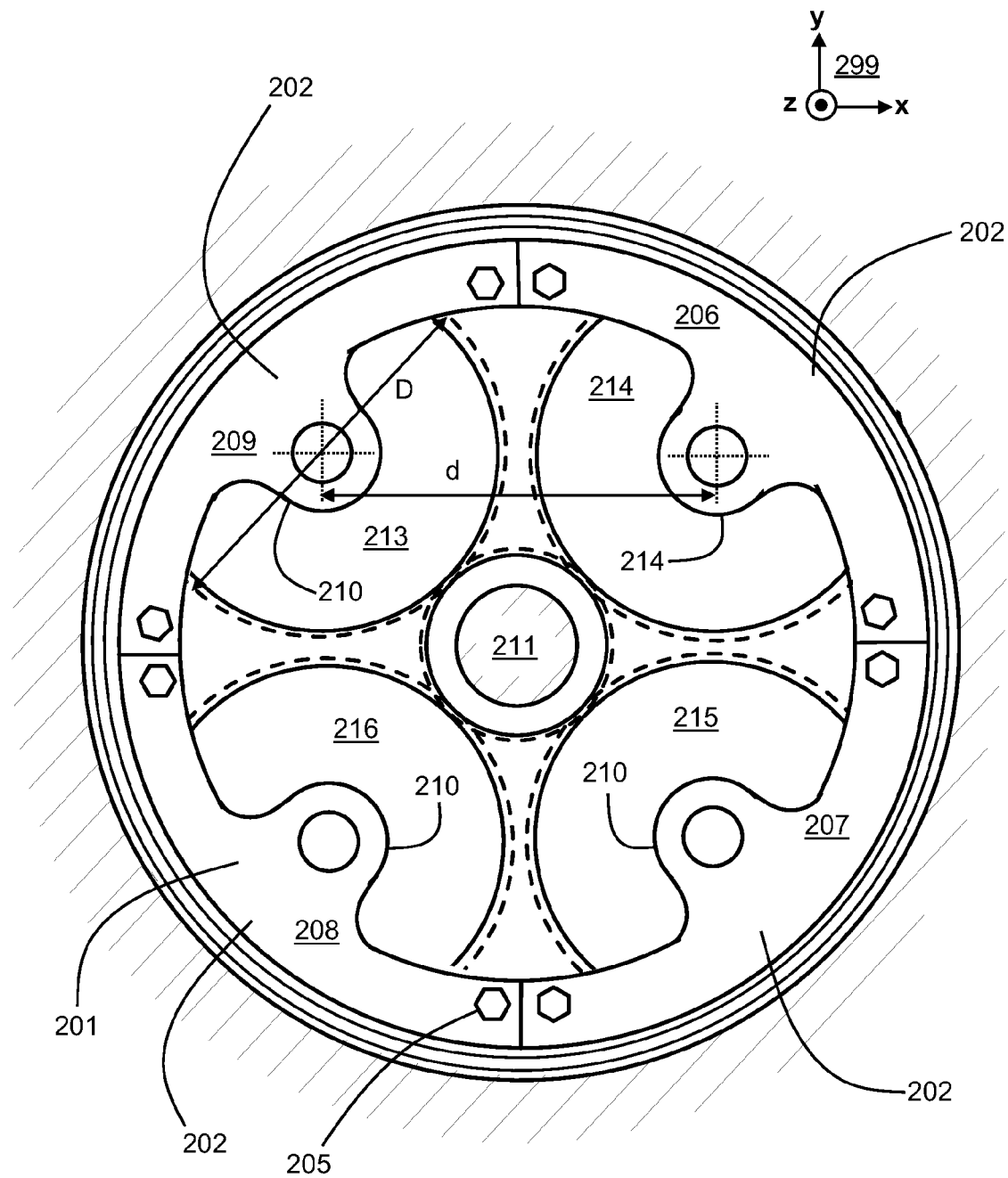
FIG. 2 illustrates a planetary gear according to another exemplifying embodiment of the invention.

FIG. 2 illustrates a planet wheel carrier 201 according to an exemplifying embodiment of the invention. The planet wheel carrier comprises a first end-section 202 for supporting first ends of the shafts of planet wheels 213, 214, 215 and 216 of a planetary gear so that the geometrical rotation axes of the planet wheels are pithed at substantially uniform intervals on a periphery of a circle. The planet wheel carrier comprises a second end-section for supporting the second ends of the shafts of the planet wheels. The second end-section is not shown in FIG. 2 but the second end-section can be according to what is illustrated in FIG. 1a. The planet wheel carrier comprises a support structure connected to the first and second end-sections and located between the first and second end-sections in the axial direction of the planet wheels and between the planet wheels in the circumferential direction of the planet wheel carrier. The support structure is not shown in FIG. 2 but the support structure can be according to what is illustrated in FIGS. 1a and 1c. In the exemplifying case illustrated in FIG. 2, the first end-section 202 of the planet wheel carrier 201 comprises separate sectors 206, 207, 208 and 209. Each of the sectors 206-209 comprises a portion for supporting one the first ends of the shafts of the planet wheels, and each of the sectors 206-209 is attached to the support structure so that each of the sectors 206-209 is separately and non-destructively detachable from the support structure. In the exemplifying case illustrated in FIG. 2, the sectors 206-209 are attached to the support structure with the aid of bolts. One of the bolts is denoted with a reference number 205 in FIG. 2. There can be, for example but not necessarily, mutually matching indentations in the support structure and in each of the sectors 206-209 so as to transfer torque between the support structure and the sectors 206-209. The fact that each of the sectors 206-209 is separately and non-destructively detachable from the support structure facilitates the maintenance of the planetary gear because, after removing one of the sectors, the respective planet wheel can be removed and installed substantially in the axial direction of the planet wheels, i.e. the planet wheel can be removed substantially in the positive z-direction of a coordinate system 299 shown in FIG. 2 and installed substantially in the negative z-direction of the coordinate system 299. In the exemplifying case illustrated in FIG. 2, each sector supports one of the planet wheels. It is also possible that there are two sectors each supporting two of the planet wheels.

The first end-sections of the planet wheel carriers 101 and 201 illustrated in FIGS. 1a and 1b and in FIG. 2 are shaped to comprise cantilevers protruding towards the geometrical rotational symmetry axis of the sun shaft so that each of the cantilevers is configured to support one of the first ends of the shafts of the planet wheels. In FIG. 2, the cantilevers are denoted with a reference number 210. The purpose of the shape comprising the above-mentioned cantilevers is to maximize the open area surrounded by the first end-section so as to further facilitate the maintenance of the planetary gear.

In the exemplifying planetary gears illustrated in FIGS. 1a-1c and 2, the number of the planet wheels is four. It is, however, also possible that the number of the planet wheels is more or less than four.

In the exemplifying cases illustrated in FIGS. 1a-1c and 2, the gear ring is stationary and the planet carrier and the sun shaft are rotatable. It is also possible that the planet carrier is stationary and the sun shaft and the gear ring are rotatable. Furthermore, it is also possible that the sun shaft is stationary and the planet wheel carrier and the gear ring are rotatable. Irrespectively whether or not the sun shaft is rotatable, the sun shaft has a geometrical rotational symmetry axis which is mentioned in the appended claims.

In the exemplifying cases illustrated in FIGS. 1a-1c and 2, the whole second-end section is non-destructively detachable from the support structure. It is, however, also possible that in some exemplifying embodiments of the invention only a part or parts of the second end-section is/are non-destructively detachable from the support structure. For example, concerning the case illustrated in FIG. 2, it could be in some cases sufficient that only two of the sectors, e.g. the sectors 209 and 207, are non-destructively detachable from the support structure and the sectors 206 and 208 are integral parts of the support structure, i.e. non-detachable.

The specific examples provided in the description given above should not be construed as limiting the applicability and/or interpretation of the appended claims.

What is claimed is:

1. A planet wheel carrier for a planetary gear, the planet wheel carrier comprising:
   a first end-section for supporting first ends of shafts of planet wheels of the planetary gear,
   a second end-section for supporting second ends of the shafts of the planet wheels, and
   a support structure connected to the first and second end-sections and located between the first and second end-sections in an axial direction of the planet wheels and between the planet wheels in a circumferential direction of the planet wheel carrier,
wherein the first end-section comprises at least one sector constituting a part of the first end-section and comprising a portion for supporting at least one but not all of the first ends of the shafts of the planet wheels and being attached to the support structure so that the at least one sector of the first end-section is non-destructively detachable from the support structure, the at least one sector being separate and non-destructively detachable from another part of the first end-section comprising another portion for supporting at least one but not all of the first ends of the shafts of the planet wheels.

2. A planet wheel carrier according to claim 1, wherein the first end-section comprises two or more separate sectors each of which comprising a portion for supporting at least one of the first ends of the shafts of the planet wheels and being attached to the support structure so that each of the sectors is non-destructively detachable from the support structure.

3. A planet wheel carrier according to claim 2, wherein each of the sectors of the first end-section is configured to support one and only one of the first ends of the shafts of the planet wheels.

4. A planet wheel carrier according to claim 3, wherein the first end-section is shaped to comprise cantilevers protruding towards a geometrical rotational symmetry axis of the sun shaft so that each of the cantilevers is configured to support one and only one of the first ends of the shafts of the planet wheels.

5. A planet wheel carrier according to claim 2, wherein the first end-section is shaped to comprise cantilevers protruding towards a geometrical rotational symmetry axis of the sun shaft so that each of the cantilevers is configured to support one and only one of the first ends of the shafts of the planet wheels.

6. A planet wheel carrier according to claim 1, wherein the first end-section is shaped to comprise cantilevers protruding towards a geometrical rotational symmetry axis of the sun shaft so that each of the cantilevers is configured to support one and only one of the first ends of the shafts of the planet wheels.

7. A planet wheel carrier according to claim 1, wherein the support structure is connected to outer rims of the first and second end-sections and configured to be so far from a geometrical rotational symmetry axis of a sun shaft of the planetary gear and geometrical rotation axes of the planet wheels are configured to be so near to the geometrical rotational symmetry axis of the sun shaft that a maximum diameter of the planet wheels is capable of being at least 90% of a distance between the geometrical rotation axes of adjacent ones of the planet wheels.

8. A planet wheel carrier according to claim 7, wherein the support structure is configured to be so far from the geometrical rotational symmetry axis of the sun shaft and the geometrical rotation axes of the planet wheels are configured to be so near to the geometrical rotational symmetry axis of the sun shaft that the maximum diameter of the planet wheels is capable of being at least 95% of the distance between the geometrical rotation axes of adjacent ones of the planet wheels.

9. A planet wheel carrier according to claim 1, wherein the planet wheel carrier is configured to support at least four planet wheels.

10. A planet wheel carrier according to claim 1, wherein the planet wheel carrier comprises mutually matching indentations in the support structure and in the first-end section so as to transfer torque between the support structure and the first-end section.

11. A planetary gear comprising: a sun shaft, a gear ring, planet wheels, and a planet wheel carrier for supporting the planet wheels so that the planet wheels are meshing with the sun shaft and with the gear ring, the planet wheel carrier comprising:
    a first end-section for supporting first ends of shafts of the planet wheels,
    a second end-section for supporting second ends of the shafts of the planet wheels, and
    a support structure connected to the first and second end-sections and located between the first and second end-sections in an axial direction of the planet wheels and between the planet wheels in a circumferential direction of the planet wheel carrier,
wherein the first end-section comprises at least one sector constituting a part of the first end-section and comprising a portion for supporting at least one but not all of the first ends of the shafts of the planet wheels and being attached to the support structure so that the at least one sector of the first end-section is non-destructively detachable from the support structure, the at least one sector being separate and non-destructively detachable from another part of the first end-section comprising another portion for supporting at least one but not all of the first ends of the shafts of the planet wheels.

12. A planetary gear according to claim 11, wherein the planet wheel carrier comprises mutually matching indentations in the support structure and in the first-end section so as to transfer torque between the support structure and the first-end section.

* * * * *